United States Patent [19]

Rausing

[11] Patent Number: 5,085,882
[45] Date of Patent: Feb. 4, 1992

[54] METHOD FOR THE COOLING OF A PRODUCT FLOW CONTAINING SOLID AND/OR SEMISOLID FOODSTUFF PARTICLES

[75] Inventor: Hans Rausing, Wadhurst, England

[73] Assignee: Tetra Pak Holdings S.A., Pully, Switzerland

[21] Appl. No.: 606,615

[22] Filed: Oct. 31, 1990

[30] Foreign Application Priority Data

Nov. 10, 1989 [GB] United Kingdom ............... 8925405

[51] Int. Cl.$^5$ ................................................. A23L 3/00
[52] U.S. Cl. .......................................... 426/524; 62/63; 99/470; 165/65; 426/521
[58] Field of Search ............... 426/524, 521, 523, 589, 426/509; 99/470; 62/63; 165/65

[56] References Cited

U.S. PATENT DOCUMENTS

| | | | |
|---|---|---|---|
| 4,214,013 | 7/1980 | Hirahara | 426/509 |
| 4,543,263 | 9/1985 | Goldhahn | 426/524 |
| 4,929,463 | 5/1990 | Meyer | 426/521 |

FOREIGN PATENT DOCUMENTS

| | | |
|---|---|---|
| 0034291 | 8/1981 | European Pat. Off. . |
| 2412316 | 7/1979 | France . |
| 2139994 | 11/1984 | United Kingdom . |
| 2176688 | 1/1987 | United Kingdom . |
| 2189586 | 10/1987 | United Kingdom . |

*Primary Examiner*—George Yeung
*Attorney, Agent, or Firm*—Burns, Doane, Swecker & Mathis

[57] ABSTRACT

A method for the cooling of a heated, e.g. heat-sterilized, flow containing particles of foodstuff character is disclosed. The flow is separated into a high particle flow, and a low particle flow which is cooled separately from the high particle flow and is used later as a cooling medium for the cooling of the high particle flow. The method can be used in aseptic packaging wherein a heat-treated, cooled foodstuff product, e.g. fruit soup, vegetable soup, meat broth, etc., is packed in sterilized packing containers, or in packing containers manufactured from sterilized packing material, under aseptic packing conditions.

5 Claims, 1 Drawing Sheet

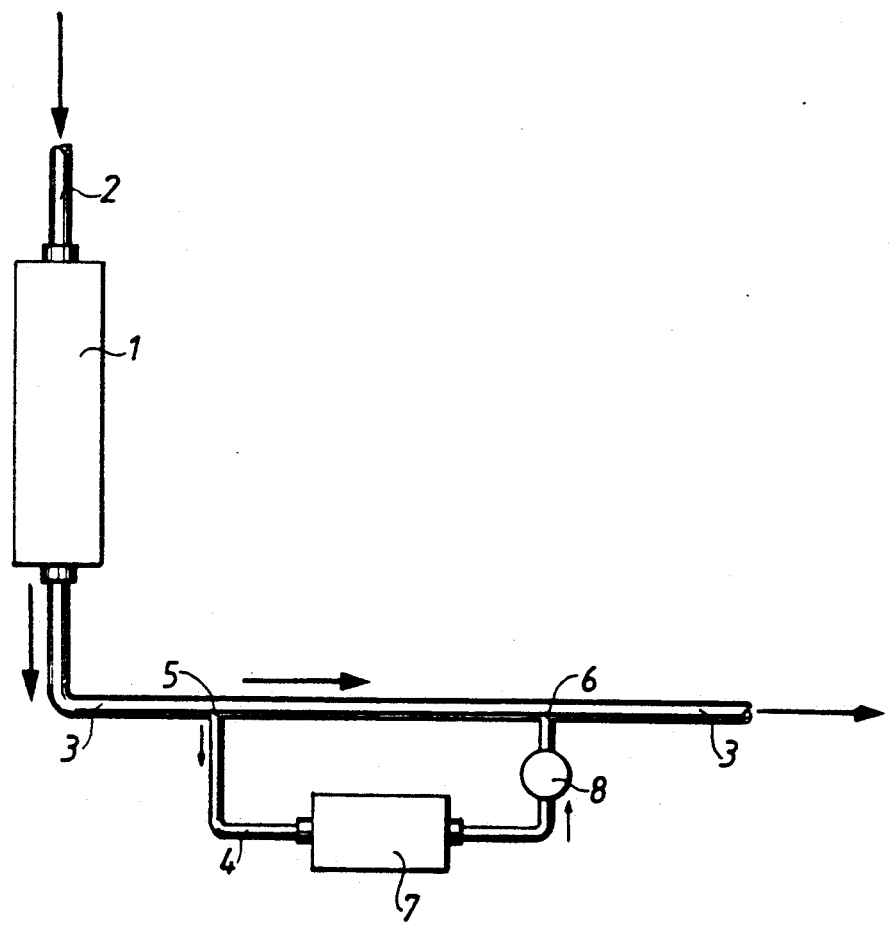

METHOD FOR THE COOLING OF A PRODUCT FLOW CONTAINING SOLID AND/OR SEMISOLID FOODSTUFF PARTICLES

BACKGROUND OF THE INVENTION

1. Field of the Invention

The present invention relates to a cooling method and more particularly to a method for the cooling of a heated flow containing solid and/or semisolid product particles of foodstuff character.

2. Description of the Related Art

In packing technology, aseptic packaging is frequently used for the packing of particularly bacteria-sensitive and storage-sensitive products, e.g. foodstuffs, which can be rapidly destroyed or seriously impaired if they are subjected to uncontrolled microbiological influences. Aseptic packaging in principle is based on the concept that the product which is to be packed should first be sterilized and subsequently be packed in separately sterilized packing containers, or in packing containers manufactured from sterilized packing material, under sterile or aseptic conditions so as to prevent a reinfection of the sterilized product. The aseptic packing technique has the number of advantages over other conventional, non-aseptic packing technique from a point of view of keeping property of the product as well as of distribution. This means, inter alia, that the aseptically packaged product, whilst preserving virtually unchanged freshness qualities can be stored during appreciably longer storage periods than is the case for a corresponding, non-aseptically packed product. Moreover, such storage of the aseptic product during the whole of its handling, from the actual packaging to the final consumer, can take place without any need for cold storage or an unbroken cooling chain, which appreciably facilitates the distribution of the product.

Since bacteriia and other microorganisms generally are very temperature-sensitive and rarely survive at temperatures above approx. 100°-110° C., it is customary for product sterilization on aseptic packages to be carried out by means of a controlled heat treatment. This means that the product, according to a predetermined time/temperature scheme, is heated to, and is maintained at, a temperature which is high enough for the desired killing or sterilizing effect, whereafter the product is cooled and is then packed. With the help of modern aseptic packing machines of the type which form, fill and close finished packages it is possible at present to carry out the whole aseptic packing procedure, including product sterilization, continuously on a large scale.

A heat treatment of the type which has been described above is both simple and effective from a point of view of sterilization, and in general functions well with foodstuffs of the type of milk, juice or other liquid or pumpable, homogeneous products. Treatment may, however become more problematic and difficult to carry out with more heterogeneously composed foodstuffs which contain both solid and liquid components. Examples of products of the last-mentioned heterogeneous type are, for example, meat broths, vegetable soups and similar mixtures of sauces/juices and meat/fruit pulp particles. Foodstuffs, whether they are in solid or in liquid form, are heat-sensitive and may easily be damaged by a heat treatment if the same is too extensive and/or is performed at too high a temperature. In order to avoid such a damaging heat effect it is important, therefore, for the sterilizing heat treatment to be carried out at a predetermined temperature which is, right for the particular foodstuff. On the one hand, the temperature should be sufficiently high so as to ensure a sterilizing effect, but on the other hand the temperature should not be high enough for the foodstuff to suffer damage or even risk suffering damage by the treatment. The extent of the heat treatment, moreover, should be adapted to keep the total heat load on the foodstuff within such limits that the smallest possible negative effect on the qualities of the product is assured. This means in practice that the actual heating process to the desired sterilization temperature preferably should be as rapid as possible, and that the cooling process after the sterilization ought to be carried out rapidly also so that the total heat load on the foodstuff can be kept to a minimum without the sterilization effect being neglected.

With the help of so-called ohmic heating, which is based on converting electric energy into thermal energy directly in the foodstuff by allowing an electrically conducting flow of the product to pass between oppositely charged electric voltage poles, it is now possible to achieve a very rapid heating and accordingly a limited heat load on the product inasfar as the heating part of the sterilizing process is concerned. However, it has proved to be more difficult to cool the heated product flow equally quickly, or at least sufficiently quickly, in order to effect minimization of the total heat load on the product during cooling too. The problem in particular involves highly viscous, heterogeneous product types containing both liquid and solid or semisolid components of the afore-mentioned type, and to a large extent is connected with, or is due to, the fact that as a rule it is much easier to cool the liquid element in the product than the solid or semisolid components. The solid or semisolid components require longer cooling periods, and thereby limit the possibility of carrying out the cooling process within the desired minimum amount of time. The drawn-out cooling process and the increased heat load connected therewith often has led to the solid and/or semisolid components of the finished product having been subjected to an impairment of quality which expresses itself, among other things, in a partially lost nutritional content, impaired chewing resistance, and also generally negatively affected organoleptic properties. At the same time, the relatively long cooling transport distances which the product is by necessity forced to travel by pumps, contributes further to an impairment of the qualities of the product due to the pumps mechanical effect on the product.

OBJECTS AND SUMMARY OF THE INVENTION

It is an object of the present invention, therefore, to indicate a new method of cooling a heated or heat-treated flow containing solid and/or semisolid particles of foodstuff character without the associated inconveniences of the type discussed above.

It is another object of the invention to indicate a method for the cooling of heterogeneously composed, highly viscous products which is both rapid and effective and which can be integrated very well in a continuous, aseptic packaging process using modern, rational packing machines.

The above objects as well as other objects not specifically enumerated are accomplished by a method of cooling in accordance with the present invention. The method of the present invention for the cooling of a heated product flow containing solid and/or semisolid particles of foodstuff character includes the steps of separating the flow into a high particle flow and a low particle flow, cooling the low particle flow, and subsequently cooling the high particle flow using the low particle flow as a cooling medium.

BRIEF DESCRIPTION OF THE DRAWINGS

The preferred embodiment of the present invention will be described in greater detail with reference to the accompanying drawing, wherein like members bear like reference numerals and wherein:

FIG. 1 is a schematic view of a system for heat sterilizing and then cooling a product flow.

DETAILED DESCRIPTION OF THE PREFERRED EMBODIMENTS

FIG. 1 shows schematically a system for heat sterilization and subsequent cooling of a foodstuff flow containing both liquid and solid or semisolid phases, e.g. a vegetable soup or a meat/sauce mixture. The system comprises a heating or heat-sterilizing device 1 with an inlet pipe 2, and an outlet pipe 3 which in turn is connected to a shunt or parallel duct 4 at branch points 5 and 6 located at upstream and downstream points respectively. In the duct circuit 4 is arranged a heat exchanger and cooling device 7 and a pump 8 located before the downstream branch point 6. The outlet pipe 3 may be connected after the downstream branch point 6, for example, to the product filling pipe of an aseptic packing machine, not shown, of the type which forms, fills and closes aseptic packages under aseptic conditions. The heating device 1 may be a conventional heat exchanger device of the plate type, but is preferably an ohmic heating device which very rapidly heats the product intended for sterilization to a predetermined, suitable sterilization temperature. The heat exchanger or cooling device 7 too may be of the plate type or of some other known kind.

By means of the system shown, the method in accordance with the invention is carried out in the following manner. The product, for example vegetable soup or sauce/meat mixture, is conducted through the inlet pipe 2 into the heating device 1 and is heated to a predetermined sterilization temperature. The heated or sterilized product is discharged through the outlet pipe 3 and is divided into a high particle flow and a low particle flow. The low particle flow is discharged from the pipe 3 through the duct 4 with the help of any suitable separating device which readily lets through the liquid product phase but which on the other hand prevents particles above a certain minimum particle size from passing through the separating unit into the duct 4. The low particle flow is pumped with the help of the pump 8 through the heat exchanger and cooling device 7 for cooling by means of heat exchange with a colder medium in a manner known in itself. From the device 7, the cooled, low-particle flow is pumped back into the outlet pipe 3 at the branch point 6 where the cooled flow is remixed with the high-particle flow separated at the branch point 5. At the remixing point 6 a spontaneous intimate contact occurs between the cooled flow and the particles in the warmer flow which thereby are effectively cooled and partly continue to be cooled during the further progress of the combined flow through the pipe 3 into the packing machine, not shown in the drawing.

With the help of the method in accordance with the invention, it is thus possible to cool very rapidly the heated or heat-treated product flow containing solid and/or semisolid foodstuff particles, and, in particular, the method has been found to be especially effective in the cooling of highly viscous product mixtures containing particle fractions larger by volume than the liquid phase. An effective and rapid cooling is achieved even if the volume of the liquid component of the product mixture amounts to not more than a few percent (%) of the solid or semisolid phase.

While this invention has been illustrated and described in accordance with a preferred embodiment, it is recognized that variations and changes may be made therein without departing from the invention as set forth in the claims.

What is claimed is:

1. A method for the cooling of a heated product flow containing solid and/or semisolid particles of foodstuff character, comprising the steps of:
    separating the flow at a separation point into a high particle flow having particles greater than a predetermined size and a low particle flow having particles smaller than said predetermined size;
    cooling said low particle flow; and
    subsequently mixing said low particle flow with said high particle flow downstream of said separation point whereby said cooled low particle flow serves as a cooling medium for said high particle flow.

2. A method in accordance with claim 1, wherein said product flow is separated by a pump which continuously separates said low particle flow and said high particle flow and, after cooling of said low particle flow, pumps said cooled low particle flow back to mix it again with said high particle flow.

3. A method in accordance with claim 1, wherein said low particle flow is smaller by volume than said high particle flow.

4. A method in accordance with claim 1, wherein particles in said product flow are selected from the group consisting of meat, fruit and vegetables.

5. A method in accordance with claim 4, further including a step of heat-treating said product flow by ohmic heating.

* * * * *